UNITED STATES PATENT OFFICE.

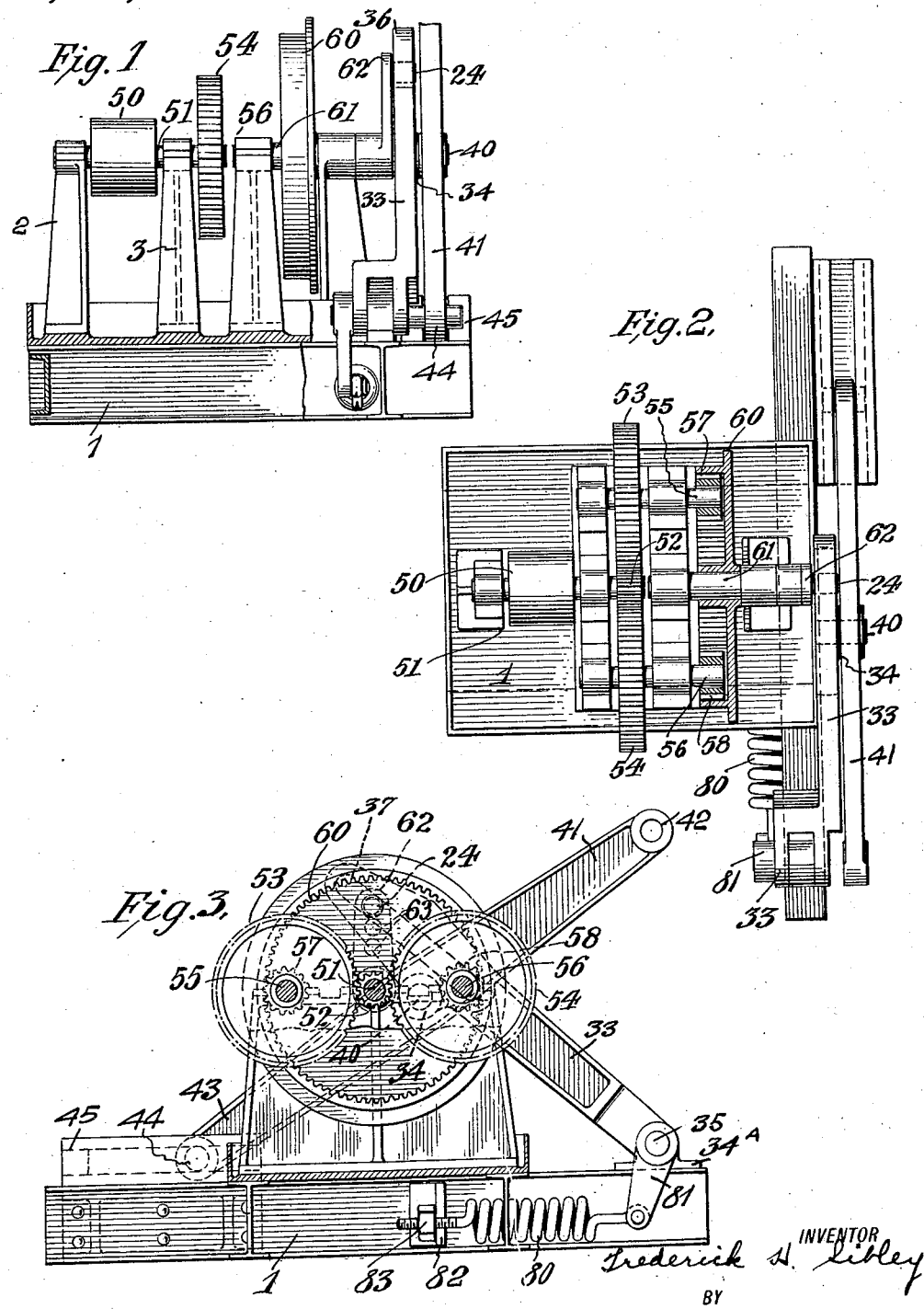

FREDERICK H. SIBLEY, OF LAWRENCE, KANSAS, ASSIGNOR TO MAXIMUM POWER CO., OF WILMINGTON, DELAWARE, A CORPORATION OF DELAWARE.

PUMPING DEVICE FOR PUMPING OIL WELLS.

1,414,158.  Specification of Letters Patent.  Patented Apr. 25, 1922.

Application filed April 9, 1920. Serial No. 372,425.

*To all whom it may concern:*

Be it known that I, FREDERICK H. SIBLEY, a citizen of the United States, residing at Lawrence, in the county of Douglas and State of Kansas, have invented a certain new and useful Improvement in a Pumping Device for Pumping Oil Wells, of which the following is a specification.

Devices of this kind, with which I am familiar are objectionable because of one or more features which require a very large amount of power to operate the pump, this being due to the fact that they are so constructed that there is a very considerable lateral strain on the pump rod which very materially increases the friction and consequently the amount of power required to drive the pump. In addition to this the fact that the pump beam swings on an arc thus inducing this lateral strain and extra pressure puts so much of a strain upon the pump rod that in a comparatively short time the device loosens the foundation regardless of how securely they are made, it being practically impossible to hold devices of this kind securely for any length of time.

My invention has for its object to provide a device in which the amount of power required to operate a given pump will be materially lessened due to the manner of applying the power due to the fact that by my improved device I am able to produce an absolutely straight line thrust bearing withdrawn upon the thrust rod thus eliminating the friction, and at the same time since the lateral movement is removed obviates the tendency to loosen the device on its foundation.

My means of accomplishing the foregoing object may be more readily understood by having reference to the accompanying drawing, which is hereunto annexed and is a part of the specification, in which:

Fig. 1 is a side elevation partly in section of my improved device.

Fig. 2 is a top or plan view of the same.

Fig. 3 is an end elevation partly in section of the same.

Similar reference numerals refer to similar parts throughout the entire description.

As shown in the drawings, the device is mounted upon a frame 1 which forms the base upon which the pumper is mounted. The means for driving the pumper comprises a pulley 50 which is adapted to receive a belt from any convenient source of power (not shown). This pulley is mounted upon a horizontal shaft 51 which is suitably journaled in bearings formed in uprights 2 and 3 which are either cast integral with the bed plate or secured thereto in any suitable or convenient means.

The shaft 51 has mounted upon its inner end, a spur pinion 52. This pinion meshes with a pair of spur gears 53 and 54 which are mounted upon shafts 55 and 56. Upon the ends of these shafts 55 and 56 are mounted spur pinions 57 and 58 which mesh with an internal annular spur gear 60 at points diametrically opposite to each other, thus transmitting motion thereto in a uniform direction.

The internal annular spur gear 60 is secured to a shaft 61, the outer end of which carries a crank arm 62. This arm may be provided with a plurality of openings 63 in one of which is mounted the crank pin 24. The bearings for carrying the shafts upon which the gears are mounted should preferably be either ball or roller bearings to reduce the friction.

An oscillating lever 33 is pivotally mounted upon a pin or pivot 35 which is fixedly secured in a bearing 34$^a$ which is secured to the bed plate 1. The other end 36 of the lever 33 is provided with a longitudinal slot 37 which is fitted to and coincides with the crank pin 24, so that as the crank is rotated it carries with it the crank pin; this oscillates the pivoted lever 33 through an angle of approximately thirty-five degrees above the center of the pivot pin 35 which is fixedly mounted to the bed plate 1.

Upon the lower side of the lever 33 adjacent its center, I form a lug 34. A pin 40 is fixedly mounted in this lug and connects the lever to the pump beam 41 in which it is rotatable. The outer end 42 of the pump beam 41 is constructed so that it may be attached to the regulation link and sucker rod clamp (not shown) for connection to the pump.

The other end 43 of the pump beam 41 is provided with a pin 44, upon which is rotatably mounted a roller which is fitted to and adapted to slide in horizontal guides 45.

Practice has shown that it is very desirable to have some means of balancing the weight of the sucker and sucker rod so as to give a more uniform pull on the motor and also to provide means for imparting a sudden movement to the sucker rod on its suction stroke. I accomplish this result by providing a spring 80 which is attached to a crank arm 81 which is either cast integral with the lever 33 or may be attached thereto so as to swing upon the pivot pin 35 when the lever 33 is oscillated vertically. The other end of the spring 80 is threaded and passes through a hole in a bracket 82 which is bolted or riveted to the base 1 of the machine, a nut 83 being provided to hold the spring in position, and for the further purpose of making it possible to adjust the tension of the spring to any weight of rod and to secure any desired tension thereby.

The operation of the device is as follows: The rotation of the shaft 51 rotates the pinion 52 which in turn drives the spur pinions 53 and 54. These being fixedly attached to the shafts 55 and 56, rotate these shafts and in turn the pinions 57 and 58 mounted upon the outer ends thereof. These pinions being in mesh with the teeth of the internal gear 60 cause it to rotate carrying with it the crank 62 and this, through the medium of the crank pin 24 which slides in the slot 37, imparts an oscillating movement to the pivoted lever 33. Inasmuch as the vertical lever 33 is attached by means of the pin 40 to the pump beam 41, it follows that the pump beam is vertically reciprocated. Inasmuch however, as the pivoted lever 33 swings about and upon its fixed pivot 35, it will be apparent that it necessarily moves in the arc of a circle and would consequently cause the end 42 of the pump beam to swing in the arc of a circle; but I avoid this by mounting the other end of the pump beam in the manner hereinbefore described which permits it to slide horizontally in the guide 45 in proportion as the end 42 is moved vertically. In this manner I am enabled to completely compensate for the curvature of the arc and bring about an absolutely straight line movement for the end 42 of the pump beam 41, thus eliminating all lateral strain on the casing head and consequently reducing the friction and tendency to loosen the device upon its base completely.

It will be apparent that this construction permits of a tremendous gear reduction. It may even be as high as 25 to 1, and this enables me to operate my pumper for a well with a very small motor, which can be run at a high speed thereby attaining greater economy.

As the end 42 of the pump beam 41 is moved downwardly, it is apparent that at the time it reaches its lowest point, the lever 33 will also be at its lower point and this will have moved the crank arm 81 so as to extend the spring 80 to its fullest amount, so that the spring will be in a position to exert its highest tension at the time when the sucker rod (not shown) is at the bottom of the well, and at the instant the return or upward stroke begins, the spring will tend to move the rod upwardly more rapidly, thus creating a larger vacuum than the usual type of pumper with its slow even stroke produces. This has proved to be extremely beneficial in practice and is one of the important features of my invention.

Having described my invention what I regard as new and desire to secure by Letters Patent is:

1. In a device of the character described the combination with a base of a rotating member, a fixed pivot pin mounted on the base, a lever secured thereto having a slot formed therein, a crank pin on the rotating member which slides in said slot, a pump beam pivotally secured to the said lever, a roller mounted adjacent one end of said pump beam, horizontal guides intermediate which said roller slides.

2. In a device of the character described the combination with a base, of a fixed pivot pin mounted on said base, a rotating member, a lever having a slot formed therein adjacent one end, a crank pin on the rotating member which slides in said slot, said lever being mounted on said pivot pin, a pump beam pivotally secured to the said lever, a roller secured to the lower end of said pump beam, horizontal guides intermediate which said roller slides.

3. In a device of the character described the combination with a base, of a fixed pivot mounted thereon, a lever, one end of which swings on said pivot, there being a slot formed in said lever, rotated means to oscillate said lever upon its pivot, horizontal guides, a roller intermediate said guides, a pump beam to which said roller is secured, means to connect the pump beam to the pivoted lever, a crank arm which extends downwardly from the fixed end of the pivoted lever, a spring one end of which is secured to said arm, a bracket secured to the base of the machine, there being an opening in said bracket through which the other end of the spring passes, and means to adjust the tension of said spring.

4. In a device of the character described, the combination with a base, of a fixed pivot mounted thereon, a rotating member, a lever having a slot formed therein mounted on said pivot, a crank pin on the rotating member slidable in said slot, a pump beam pivotally secured to said lever, a roller secured adjacent one end of the pump beam, guides intermediate which said roller slides, a shaft which carries said rotating member, an internal gear mounted on said shaft, a driven shaft, a spur pinion mounted thereon, spur gears which mesh with said pinion at diametrically opposite points, shafts on which said spur gears are mounted, pinions on one end of each of said shafts in mesh with the internal gear, whereby the rotation of the rotating member oscillates the pivoted lever.

5. In a device of the character described, the combination with a base, of a fixed pivot secured thereto, a rotating member, a pivoted lever mounted on said pivot, there being a slot formed in said lever, a crank pin on the rotating member which slides in said slot, whereby said pivoted lever is oscillated when the rotating member rotates, a pump beam, pivotally secured to said lever, and means secured to said pump beam whereby a straight line movement is secured to one end thereof, a crank arm on the pivoted end of said lever, a spring secured thereto which is extended and compressed by the oscillation of said lever, said spring being adapted to exert its greatest tension when the end of said pump is at the lowest point.

6. In a device of the character described, the combination with a base, of a fixed pivot mounted thereon, a rotating member, a lever having a slot formed therein, a crank pin on the rotating member which slides in said slot, said lever being mounted on said pivot, a pump beam pivotally secured to said lever, a crank arm attached to the said lever at its lower end, a spring, one end of which is attached to said crank arm, the other end of said spring being threaded, a bracket riveted to the base, there being a hole through said bracket, through which said threaded end extends, a nut mounted on said threaded end which holds said spring in position whereby the spring may be given any desired tension.

In testimony whereof, I have signed the foregoing specification.

F. H. SIBLEY.

Witnesses:
GRACE SHROPSHIRE,
J. E. BANKS.